(12) United States Patent
Nica (10) Patent No.: US 9,449,045 B2
(45) Date of Patent: Sep. 20, 2016

(54) SYSTEM AND METHOD FOR ENHANCED QUERY OPTIMIZER SEARCH SPACE ORDERING

(75) Inventor: Anisoara Nica, Waterloo (CA)

(73) Assignee: Sybase, Inc., Dublin, CA (US)

( * ) Notice: Subject to any disclaimer, the term of this patent is extended or adjusted under 35 U.S.C. 154(b) by 105 days.

(21) Appl. No.: 13/082,609

(22) Filed: Apr. 8, 2011

(65) Prior Publication Data

US 2012/0259840 A1 Oct. 11, 2012

(51) Int. Cl.
*G06F 17/30* (2006.01)

(52) U.S. Cl.
CPC ............... *G06F 17/30463* (2013.01)

(58) Field of Classification Search
None
See application file for complete search history.

(56) References Cited

U.S. PATENT DOCUMENTS

| | | | |
|---|---|---|---|
| 7,184,998 B2 | 2/2007 | Nica | |
| 8,145,621 B2* | 3/2012 | Nica et al. | 707/713 |
| 8,745,037 B2* | 6/2014 | Zhou et al. | 707/718 |
| 2002/0184253 A1* | 12/2002 | Agarwal et al. | 707/206 |
| 2003/0172059 A1* | 9/2003 | Andrei | G06F 17/30454 |
| 2004/0225639 A1* | 11/2004 | Jakobsson et al. | 707/2 |
| 2008/0033914 A1* | 2/2008 | Cherniack et al. | 707/3 |
| 2008/0120273 A1* | 5/2008 | Ramesh et al. | 707/2 |
| 2008/0120275 A1* | 5/2008 | Cruanes et al. | 707/2 |

OTHER PUBLICATIONS

Thusoo, et al. "Hive—a petabyte scale data warehouse using Hadoop", Mar. 2010, IEEE, 26th Int'l Conf. on Data Engineering, pp. 996-1005.*

Bowman, I.T., P. Bumbulis, D. Farrar, A. K. Goel, B. Lucier, A. Nica, G. N. Paulley, J. Smirnios, and M. Young-Lai, "SQL Anywhere: A holistic approach to database self-management," in Proceedings, ICDE Workshops (Self-Managing Database Systems). Istanbul, Turkey: IEEE Computer Society Press, Apr. 2007, pp. 414-423.

DeHaan, D. and F. W. Tompa, "Optimal top-down join enumeration," in ACM SIGMOD International Conference on Management of Data, Beijing, China, Jun. 2007, pp. 785-796.

Ilyas,I.F., J. Rao, G. M. Lohman, D. Gao, and E. T. Lin, "Estimating compilation time of a query optimizer," in ACM SIGMOD International Conference on Management of Data, San Diego, California, Jun. 2003, pp. 373-384.

R. Klimmek and F. Wagner, "A simple hypergraph min cut algorithm," http://citeseerx.ist.psu.edu/viewdoc/summary?doi=10.1.1.31.4535. Internal Report , Bericht FU Berlin Fachbereich Mathematik und Informatik, Tech. Rep. B 96-02, 1996.

Kossman, D. and K. Stocker, "Iterative dynamic programming: A new class of query optimization algorithms" ACM Transactions on Database Systems, vol. 25, No. 1, pp. 43-82, Mar. 2000.

Moerkotte, G. and T. Neumann, "Dynamic programming strikes back," in ACM SIGMOD International Conference on Management of Data, 2009, pp. 403-414.

T. Neumann, "Query simplification: graceful degradation for join-order optimization," in ACM SIGMOD International Conference on Management of Data, 2009, pp. 403-414.

Nica, A. "A Call for Order in Search Space Generation Process of Query Optimization," Sybase, Waterloo, Ontario, Canada. 6 pgs.

Nica, A., D. S. Brotherston, and D. W. Hillis, "Extreme visualization of the query optimizer search spaces," in ACM SIGMOD International Conference on Management of Data, Providence, Rhode Island, Jun. 2009, pp. 1067-1070.

(Continued)

*Primary Examiner* — Charles Adams
(74) *Attorney, Agent, or Firm* — Sterne, Kessler, Goldstein & Fox PLLC (57) ABSTRACT

In an optimizer within a Relational Database Management System improved ways in which a search space (the universe of possible join combinations) is generated and managed and improved ways in which the elements of a search space are evaluated so that among other things unpromising elements are efficiently dropped (pruned).

22 Claims, 10 Drawing Sheets

(56) References Cited

OTHER PUBLICATIONS

Nica, A. "Immediate materialized views with outerjoins," in Proceedings, ACM Thirteenth International Workshop on Data Warehousing and OLAP (DOLAP), in ACM Ninetheenth Conference on Information and Knowledge Management (CIKM), Toronto, Canada, Oct. 2010, pp. 45-52.

Ono, K. and G. M. Lohman, "Measuring the complexity of join enumeration in query optimization," in Proceedings of the 16th International Conference on Very Large Data Bases. Brisbane, Australia: Morgan Kaufmann, Aug. 1990, pp. 314-325.

Steinbrunn, M., G. Moerkotte, and A. Kemper, "Heuristic and randomized optimization for the join ordering problem," The VLDB Journal, vol. 6, No. 3, pp. 191-208, Aug. 1997.

Swami A., "Optimization of large join queries: Combining heuristics and combinatorial techniques," in ACM SIGMOD International Conference on Management of Data, Portland, Oregon, Jun. 1989.

\* cited by examiner

Algorithm 1 *ordered-Par* Algorithm

1: Input: The $X$ algorithm, the query hypergraph $G(Q) = (V, E)$
2: Output: $BestPlan(V)$
3: *Enumeration Phase:*
4: enumerate partitions using the $X$ algorithm without costing them: call $EnumeratePartition(S_1, S_2)$ to store valid partitions in $mTable$
5: *Costing Phase:*
6: top-down plan generation: call $GenerateBestPlan(V)$

Algorithm 2 $EnumeratePartition(S_1, S_2)$

1: /* *Enumeration Phase*: Save partitions *without* costing */
2: $S = S_1 \cup S_2$ /* Keep only $MaxParSize(S)$ partitions */ ──── 502
3: if $|Partitions(S)| + 1 == MaxParSize(S)$ then ──── 502
4:    for all $(W_1, W_2) \in Partitions(S)$ do
5:       Compute the score of $(W_1, W_2)$: $Score(W_1, W_2)$ ──── 504
6:    Sort $Partitions(S)$ based on the scores
7:    Compute the score of $(S_1, S_2)$: $Score(S_1, S_2)$ ──── 504
8:    Insert $(S_1, S_2)$ in the ordered set $Partitions(S)$
9:    Remove the last element of the set $Partitions(S)$
10:    return
11: Insert $(S_1, S_2)$ in the unordered set $Partitions(S)$
12: return

FIG. 5

Algorithm 3 $GenerateBestPlan(S)$

```
 1: /* Costing Phase: Generate plans from the saved partitions of S */
 2: if BestPlan(S) != Null then
 3:    return BestPlan(S)
 4: if Partitions(S) is not ordered then
 5:    for all (W_1, W_2) ∈ Partitions(S) do
 6:       Compute the score of (W_1, W_2): Score(W_1, W_2)      — 504
 7:    Sort Partitions(S) based on the scores
 8: for all (S_1, S_2) ∈ Partitions(S) do                        — 602
 9:    if Budget(S) is exceeded and BestPlan(S) != Null then
10:       return BestPlan(S)
11:    plan_1 = GenerateBestPlan(S_1), c_1 = cost(plan_1)
12:    if c_1 > BestCost(V) || c_1 > BestCost(S) then
13:       continue
14:    plan_2 = GenerateBestPlan(S_2), c_2 = cost(plan_2)
15:    if c_2 > BestCost(V) || c_2 > BestCost(S) then
16:       continue
17:    if c_1 + c_2 > BestCost(V) || c_1 + c_2 > BestCost(S) then
18:       continue
19:    p = ∧_{(u_1,u_2)∈E, u_i⊆S_i} Pred(u_1, u_2)
20:    newplan = plan_1 ⋈_p plan_2, c_new = cost(newplan)
21:    if c_new < BestCost(S) && c_new < BestCost(V) then
22:       BestPlan(S) = newplan
23: free memory for Partitions(S)
24: return BestPlan(S)
```

FIG. 6

| Algorithm | Estimated Cost | Enumerated Partitions | Saved Partitions | Costed Partitions | Optimization Time(s) | Memory Pages |
|---|---|---|---|---|---|---|
| DPhyp | 1.83s | 28,501 | 0 | 4,263 | 0.48s | 318 |
| ordered-DPhyp | 1.83s | 28,501 | 4645 | 385 | 0.25s | 92 |
| DPhyp | 6.99s | 28,501 | 0 | 10,190 | 0.60s | 318 |
| ordered-DPhyp | 6.99s | 28,501 | 4645 | 443 | 0.31s | 92 |

SYSTEM AND METHOD FOR ENHANCED QUERY OPTIMIZER SEARCH SPACE ORDERING

BACKGROUND OF THE INVENTION

1. Field of the Invention

The present invention relates generally to information processing environments. More particularly, the present invention relates to capabilities that enhance substantially the operation, effectiveness, efficiency, etc. of query optimizers that are found in Database Management Systems (DBMSs).

2. Background Art

A common element of an information processing environment is a database, which is in effect a computer-based repository of information. Databases are extraordinarily prevalent and may be found on almost any computing platform including inter alia mainframe computers; computer servers; Personal Computers (PCs); handheld computers; pagers; Personal Digital Assistants (PDAs); cellular telephones, smart phones, and other wireless devices; radios; TVs; navigation systems; automobile audio systems; net appliances; etc.

A DBMS serves as a something of a 'bridge' between the information in a database (handling inter alia the organization of the information, the storage of the information on different devices, etc.) and users of the database. Among other things a DBMS provides database users with a logical or conceptual view of a database, allowing them to not concern themselves with inter alia the physical, implementation, etc. particulars of the database. When a user wishes to perform some action on the database (e.g., to retrieve a piece of information from the database, to update a piece of information in the database, to add a new piece of information to the database, etc.) the user will typically submit a query to the DBMS.

A database may be organized according to different models such as hierarchical, network, and relational.

Under a relational model a database may comprise inter alia one or more tables (relations), each table comprising one or more rows or records (tuples), each row/record comprising one or more columns or fields (attributes), with each column/field comprising some piece of information. As an example, a database comprising information on an organization's employees might contain a table EMPLOYEES that houses one record for each employee. Each record in the EMPLOYEES table might contain fields that preserve specifics about the employee such as inter alia the employee's name (e.g., a field named EMP_NAME), home address (e.g., a field named EMP_ADDRESS), current position, salary, work telephone number, etc.

Under a relational model a 'bridge' DBMS takes the form of a Relational DBMS (RDBMS) and a query to a RDBMS typically takes the form of a Structured Query Language (SQL) statement.

A SQL statement (such as for example 'SELECT EMP_NAME, EMP_ADDRESS FROM EMPLOYEES') expresses a desired result (in the instant example, 'please return to me the name and the address of each employee') but does not inter alia identify how those results should be obtained. In other words, the query itself does not specify how the query should be evaluated by an RDBMS. A component of an RDBMS, a query optimizer or optimizer, is responsible for inter alia (1) identifying the different valid ways in which (plans for how) the data within the database may be accessed so as to achieve the result that is requested by a SQL statement, (2) evaluating and costing the identified plans, and (3) selecting the 'best' (e.g., the cheapest, the fastest, etc.) plan.

As it completes its work a query optimizer may identify and evaluate a number of items, artifacts, criteria, etc. including inter alia join operations.

Classically a RDBMS supports dyadic join operations, that is join operations that involve just two entities such as tables (e.g., the join operation $T_1 \bowtie T_2$ involving the two tables $T_1$ and $T_2$). Consequently for a query that requires an n-way join (i.e., a join operation that involves n tables where n>2) a query optimizer must inter alia enumerate or identify (possibly just some subset of) the universe of possible join combinations (i.e., a search space); evaluate, based on various criteria including for example cost, some or all of the candidates in the search space; and then string together one specific sequence of individual two-way join operations to arrive at the 'best' (e.g., perhaps the cheapest) way of realizing the required n-way join. For example, for a four-way join involving four tables ($T_1$, $T_2$, $T_3$ and $T_4$) a query optimizer might arrive at the specific join sequence $((T_1 \bowtie T_2) \bowtie (T_3 \bowtie T_4))$.

Conventional query optimization techniques often give rise to various disadvantages. For example:

1) As the number of entities (e.g., tables) in an n-way join increases the size of the resulting search space, that is the universe of possible join combinations, grows very quickly resulting in inter alia longer and longer amounts of time to iterate through the elements of the search space (to for example access, review, cost, etc. those elements).

2) For many dynamically generated queries the execution time of the query itself may be quite small but the optimization time may be quite large and thus disproportionate to the execution time.

From all of the different plans that an optimizer may have to chose from, if it selects a 'good' plan then processing of the query will be completed 'quickly' (with possibly inter alia lower system resource consumption, etc.). Alternatively, if it selects a 'bad' plan then processing of the query will be completed 'slowly' (with possibly inter alia higher system resource consumption, etc.).

Given the performance, system resource consumption, etc. ramifications and implications of the query optimization process it is obviously very important for an optimizer to identify and select the 'best' available query execution plan. That objective—identifying and selecting the 'best' available query execution plan—is made challenging by the host of constraints that an optimizer must operate under including inter alia available system resources (such as memory), specific query characteristics, parameters such as the maximum amount of time that an optimizer may spend on any particular activity, the status of the RDBMS, etc.

Aspects of the present invention address the challenge that was noted above (1) by (a) improving upon the way in which a search space is generated and managed and (b) improving on the way in which the elements of a search space are evaluated so that among other things unpromising elements are efficiently dropped (pruned) (2) while addressing, in new and innovatory ways, various of the not insubstantial challenges that are associated with same.

SUMMARY OF THE INVENTION

In one embodiment of the present invention there is provided a server-based method for enhanced query optimizer search space management comprising (1) saving, uncosted and in an ordered fashion, a subset of the enumerated partitions that are generated by a join enumeration algorithm in a memoization construct, (2) generating a plan and costing the plan for a subset of the saved partitions, such that unpromising partitions are pruned, and (3) selecting one of the costed plans.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

The features and advantages of the present invention will become more apparent from the detailed description set forth below when taken in conjunction with the above identified drawings.

Throughout the drawings (a) like reference numbers generally indicate identical, functionally similar, and/or structurally similar elements and (b) the left-most digit(s) of a reference number generally identify the drawing in which the reference number first appears. For example, in FIG. 6 reference numeral 504 would direct the reader to FIG. 5 for the first appearance of that item.

It will be understood that the drawings identified above depict embodiments of the invention. Variations of these embodiments will be readily apparent to persons skilled in the relevant art(s) based on the teachings contained herein.

DETAILED DESCRIPTION OF THE INVENTION

Embodiments of the present invention are described herein in the context of a method and apparatus for enhanced query optimizer search space ordering. Those of ordinary skill in the relevant art will realize that the following detailed description of the present invention is illustrative only and is not intended to be in any way limiting. Other embodiments of the present invention will readily suggest themselves to such skilled persons having the benefit of this disclosure.

Reference will now be made in detail to implementations of the present invention as illustrated in the accompanying drawings and as described below.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
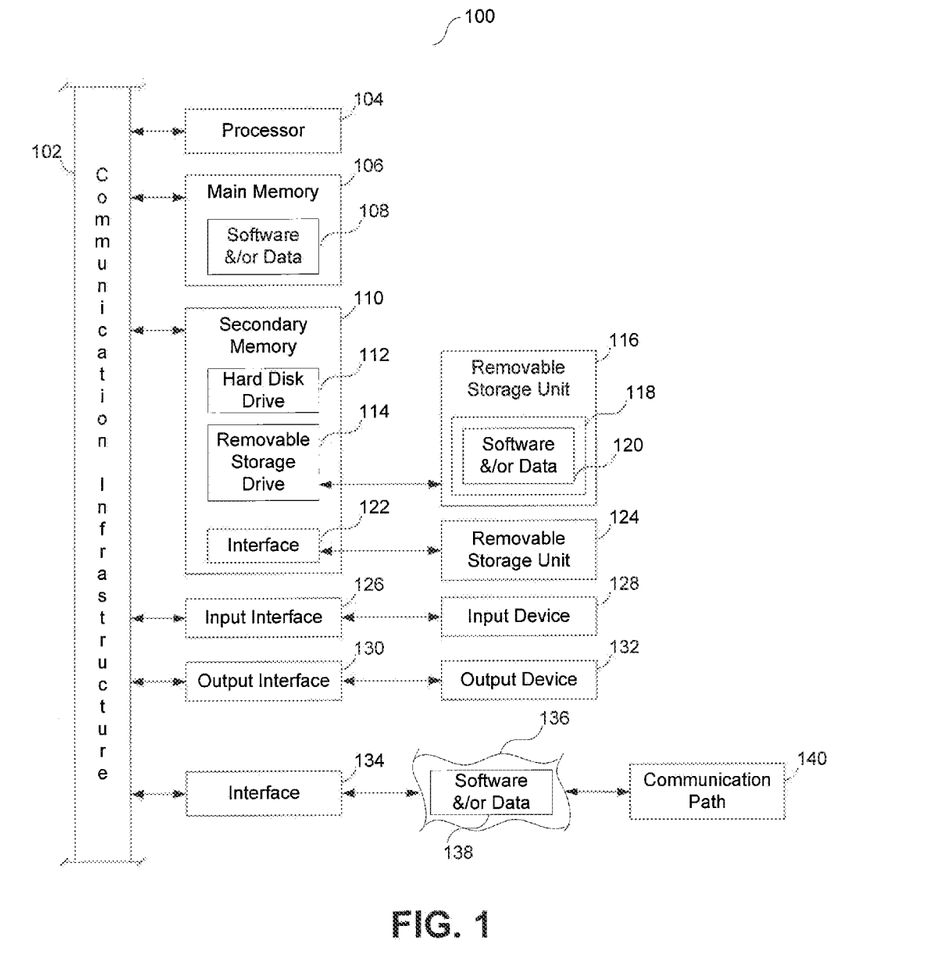
FIG. 1 depicts an exemplary computer system through which embodiments of aspects of the present invention may be implemented.

Various aspects of the present invention may be implemented by software, firmware, hardware, or any combination thereof. FIG. 1 illustrates an example computer system 100 in which the present invention or portions thereof (such as for example described below in accordance with FIGS. 3-11 and their corresponding description can be implemented as computer-readable code. Various embodiments of the invention are described in terms of this example computer system 100. After reading this description, it will become apparent to a person skilled in the relevant art how to implement the invention using other computer systems and/or computer architectures.

Computer system 100 includes one or more processors, such as processor 104. Processor 104 can be a special purpose processor or a general purpose processor. Processor 104 is connected to a communication infrastructure 102 (for example, a bus or a network).

Computer system 100 also includes a main memory 106, preferably Random Access Memory (RAM), containing possibly inter alia computer software and/or data 108.

Computer system 100 may also include a secondary memory 110. Secondary memory 110 may include, for example, a hard disk drive 112, a removable storage drive 114, a memory stick, etc. A removable storage drive 114 may comprise a floppy disk drive, a magnetic tape drive, an optical disk drive, a flash memory, or the like. A removable storage drive 114 reads from and/or writes to a removable storage unit 116 in a well known manner. A removable storage unit 116 may comprise a floppy disk, magnetic tape, optical disk, etc. which is read by and written to by removable storage drive 114. As will be appreciated by persons skilled in the relevant art(s) removable storage unit 116 includes a computer usable storage medium 118 having stored therein possibly inter alia computer software and/or data 120.

In alternative implementations, secondary memory 110 may include other similar means for allowing computer programs or other instructions to be loaded into computer system 100. Such means may include, for example, a removable storage unit 124 and an interface 122. Examples of such means may include a program cartridge and cartridge interface (such as that found in video game devices), a removable memory chip (such as an Erasable Programmable Read-Only Memory [EPROM], or Programmable Read-Only Memory [PROM]) and associated socket, and other removable storage units 124 and interfaces 122 which allow computer software and/or data to be transferred from the removable storage unit 124 to computer system 100.

Computer system 100 may also include an input interface 126 and a range of input devices 128 such as, possibly inter alia, a keyboard, a mouse, a track ball, a pointing device, etc.

Computer system 100 may also include an output interface 130 and a range of output devices 132 such as, possibly inter alia, a display monitor, one or more speakers, a printer, etc.

Computer system 100 may also include a communications interface 134. Communications interface 134 allows computer software and/or data 138 to be transferred between computer system 100 and external devices. Communications interface 134 may include inter alia a modem, a network interface (such as inter alia an Ethernet card), a communications port, a Personal Computer Memory Card International Association (PCMCIA) slot and card, or the like. Computer software and/or data 138 transferred via communications interface 134 are in the form of signals 136 which may be electronic, electromagnetic, optical, or other signals capable of being received by communications interface 134. These signals 136 are provided to communications interface 134 via a communications path 140. Communications path 140 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 116, removable storage unit 124, and a hard disk installed in hard disk drive 112. Signals carried over communications path 140 can also embody the logic described herein. Computer program medium and computer usable medium can also refer to memories, such as main memory 106 and secondary memory 110, which can be memory semiconductors (e.g. Dynamic Random Access Memory [DRAM] elements, etc.). These computer program products are means for providing computer software to computer system 100.

Computer programs or software (also called computer control logic) are stored in main memory 106 and/or secondary memory 110. Computer programs may also be received via communications interface 134. Such computer programs, when executed, enable computer system 100 to implement the present invention as discussed herein. In particular, the computer programs, when executed, enable processor 104 to implement the processes of aspects of the present invention, such as for example the steps discussed below in accordance with FIGS. 3-11 and their corresponding description. Accordingly, such computer programs represent controllers of the computer system 100. Where the invention is implemented using computer software, the computer software may be stored in a computer program product and loaded into computer system 100 using inter alia a removable storage drive 114, an interface 122, a hard drive 112 or a communications interface 134.

The invention is also directed to computer program products comprising computer software stored on any computer usable medium. Such computer software, when executed in one or more data processing devices, causes the data processing device(s) to operate as described herein. Embodiments of the invention employ any computer usable or readable medium, known now or in the future. Examples of computer usable mediums include, but are not limited to, primary storage devices (e.g., any type of RAM), secondary storage devices (e.g., hard drives, floppy disks, Compact Disc Read-Only Memory [CD-ROM] disks, Zip disks, tapes, magnetic storage devices, optical storage devices, Microelectromechanical Systems [MEMS], nanotechnological storage device, etc.), and communication mediums (e.g., wired and wireless communications networks, local area networks, wide area networks, intranets, etc.).

When it is used within a (Local Area Network (LAN), Wide Area Network (WAN), etc.) networking environment computer system 100 may be connected (by inter alia a wired connection or a wireless connection) to a network through a network interface or adapter (such as inter alia an Ethernet card) via communications interface 134. Under such a networked environment, computer programs (computer control logic) may be stored, either in whole or in part, on one or more remote memory storage devices (in addition to the previously noted main memory 106 and/or secondary memory 110).

Figure 2:
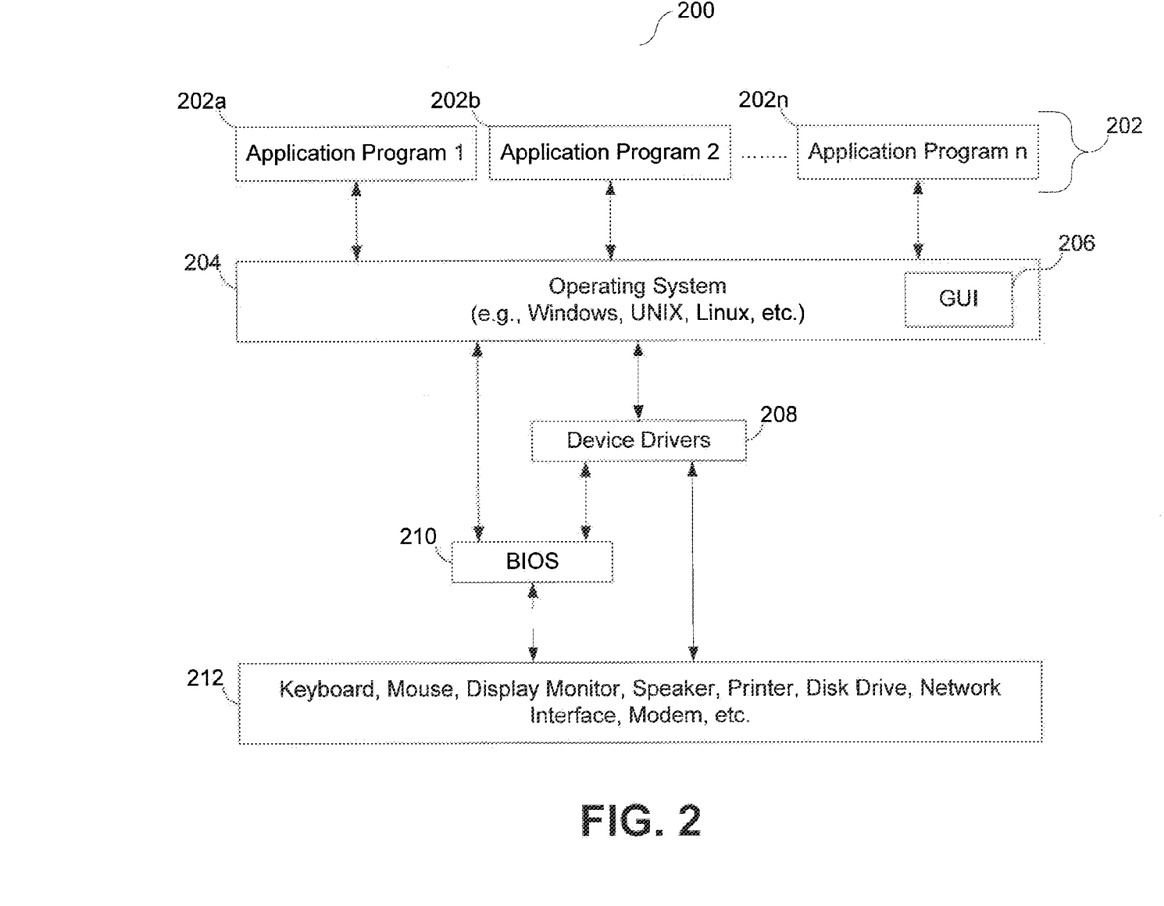
FIG. 2 illustrates an exemplary computer software environment that may among other things direct the operation of aspects of FIG. 1's computer system.

FIG. 2 illustrates a computer software environment 200 that inter alia may direct the operation of aspects of the computer system 100. Computer software environment 200, which may be stored inter alia in main memory (e.g., RAM) 106 and/or on secondary storage (e.g., a hard disk drive) 110, includes inter alia an Operating System (OS) 204. The OS 204 manages low-level aspects of computer operation including inter alia managing the execution of processes, memory allocation, file Input and/or Output (I/O), and device I/O. One or more application programs, such as client application software or programs 202 (e.g., 202a, 202b, . . . 202n) may be loaded (e.g., transferred from storage 110 into main memory 106) for execution by the computer system 100. The applications or other software intended for use on the computer system 100 may also be stored as a set of downloadable computer-executable instructions, for example, for downloading and installation from an Internet location (e.g., an application server, World Wide Web (WWW) server, etc.).

Computer software environment 200 includes inter alia a Graphical User Interface (GUI) 206 for receiving user commands and data in a graphical (e.g., a point-and-click) fashion. These inputs, in turn, may be acted upon by the computer system 100 in accordance with instructions from the OS 204 and/or client application software 202. The GUI 206 also serves to display the results of operation from the OS 204 and client application software 202, whereupon the user may supply additional inputs or terminate the session. Commonly the OS 204 operates in conjunction with possibly inter alia device drivers 208 and the system Basic Input/Output System (BIOS) 210, particularly when interfacing with peripheral devices 212.

Popular examples of OS 204 include inter alia the different versions of Windows from Microsoft®, the different versions of UNIX, the different versions of Linux, etc.

The above-described computer system and computer software environment were presented for purposes of illustrating the basic underlying PC, server, etc. computer components that may be employed for implementing aspects of the present invention. It will be readily apparent to one of ordinary skill in the relevant art that numerous other components and/or component arrangements are easily possible.

For simplicity of exposition the description below will at times present examples in which it will be assumed that there exists a "server" (e.g., an application server, a WWW server, etc.) that inter alia communicates with one or more "clients" (e.g., PCs; PDAs; handheld computers; cellular telephones, smart phones, and other wireless devices; etc.). The present invention, however, is not limited to any specific environment or device configuration. For example, a client/server distinction is not necessary to the invention but is used to provide a framework for discussion. To the contrary, the present invention may be implemented in any type of information processing environment that is capable of supporting the methodologies of the present invention as described in detail below.

Figure 3:
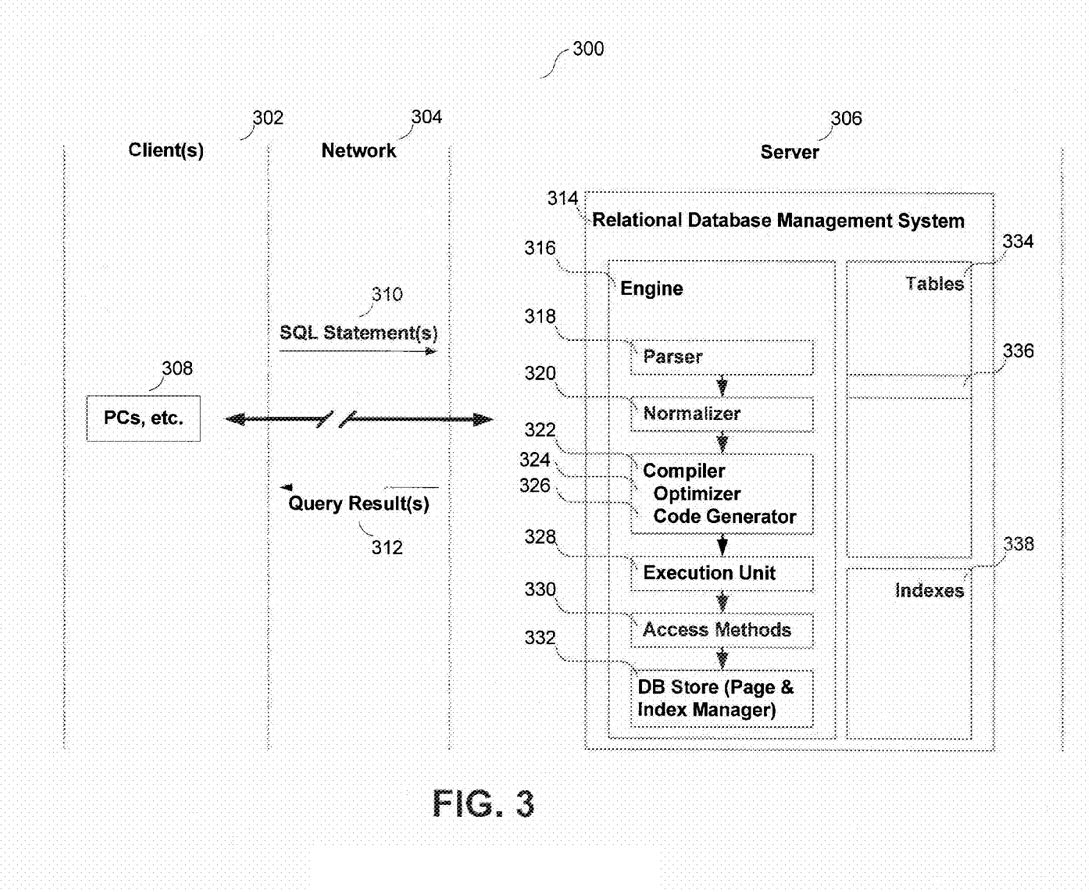
FIG. 3 illustrates aspects of an exemplary information processing environment.

FIG. 3 and reference numeral 300 illustrate aspects of an information processing environment comprising among other things one or more clients 302 (which may include inter alia PCs; handheld computers; pagers; PDAs; cellular telephones, smart phones, and other wireless devices; radios; TVs; navigation systems; etc. 308) that are inter alia in communication, via a network 304, with a server 306. The server 306 comprises inter alia a RDBMS 314.

At a high level clients 302 inter alia submit SQL statements 310 to the RDBMS 314, an engine 316 of the RDBMS evaluates and processes the SQL statements 310, and the RDBMS 314 dispatches query results 312 to the clients 308.

The exemplary RDBMS engine 316 that is illustrated in FIG. 3 comprises:

1) A parser 318 that accepts a SQL statement 310 (e.g., as received from a client 302), processes (i.e., parses, etc.) the SQL statement 310, and produces possibly inter alia a query tree.

2) A normalized 320 that processes a query tree to inter alia remove redundant operations, complete various error checking and other validation operations, etc.

3) A compiler 322 that (a) through an optimizer 324 identifies and evaluates for a query tree a range of query execution plans and then selects a 'best' plan and (b) through a code generator 326 generates the code necessary for the RDBMS to realize the selected 'best' plan.

4) An execution unit 328 that executes inter alia the generated code.

5) Various access methods 330 and a database store (page and index manager) 332 that support interactions with inter alia the different tables 334 and indexes 338 that are maintained by the RDBMS 314 to among other things arrive at the information 336 that is required to satisfy (reply to) the SQL statement 310.

The particular components and component arrangement that were depicted in FIG. 3 are illustrative only and it will be readily apparent to one of ordinary skill in the relevant art that numerous other components and/or component arrangements are easily possible.

The present invention may reside within the optimizer component 324 of a RDBMS 314 where it can be used to inter alia enhance substantially the operation, performance, etc. of an optimization algorithm (for simplicity referred to below as 'algorithm X') such as for example DPhyp( ), MinCutHyp( ), TopDown( ), etc. (as offered by for example SQL Anywhere from Sybase®) that is executed within a RDBMS optimizer. Such optimization algorithms have several common characteristics including possibly inter alia (1) they exhaustively enumerate valid partitions of the form ($S_1$, $S_2$), corresponding to the logical join operation $S_1 \bowtie S_2$, for a subset $S=S_1 \cup S_2$ and preserve same in a memoization construct (referred to below as mTable[ ]), (2) generate a plan and then cost the plan for each partition, and (3) then complete various pruning and review operations on the generated/casted plans to inter alia arrive at a 'best' plan.

Aspects of the present invention enhance substantially an algorithm X's operation, performance, etc. by inter alia ordering the enumerated partitions and generating plans for only a fraction of the partitions, effectively pruning without costing the unpromising partitions. This is accomplished through the preemption of the combined enumeration and costing activity that algorithm X would traditionally complete by (1) saving, uncosted but in an ordered fashion, only some of the enumerated partitions in a memoization construct mTable, (2) generating a plan and then costing the plan for only some subset of the saved partitions, and (3) then selecting a 'best' plan.

Figure 4:
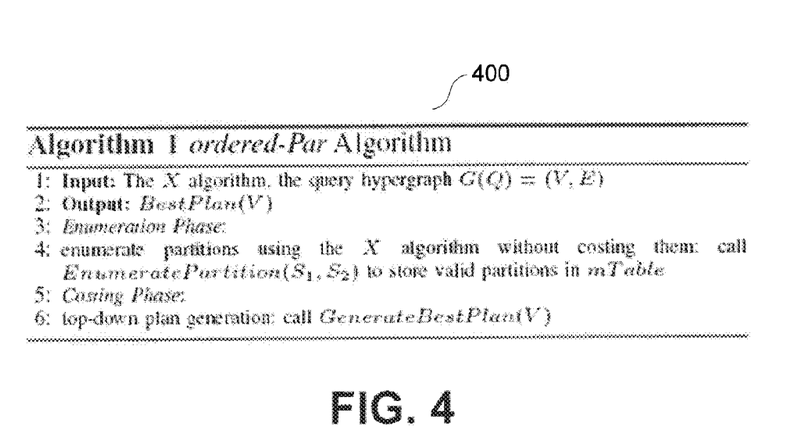
FIG. 4 illustrates an ordered-Par( ) algorithm that encapsulates aspects of the present invention.
Figure 5:
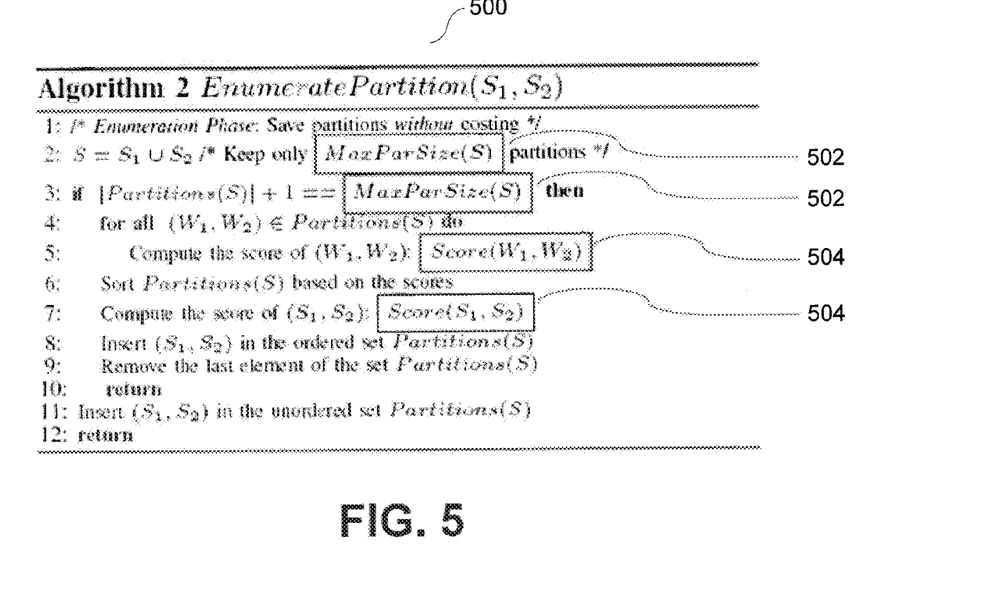
FIG. 5 illustrates one possible EnumeratePartition( ) algorithm.

FIG. 4 and reference numeral 400 present, at a high level and in pseudo code, an algorithm ordered-Par( ) that encapsulates aspects of the present invention. The ordered-Par( ) algorithm divides the enumeration and plan generation process of optimization algorithm X into two separate and distinct phases:

1) Phase 1, an enumeration phase, preempts the combined enumeration and costing of partitions that algorithm X would traditionally complete by saving, (a) uncosted but (b) in an ordered fashion, only certain of the enumerated partitions for a subset $S=S_1 \cup S_2$ in mTable[S] (referred to as Partitions(S)). FIG. 5 and reference numeral 500 depict, at a high level and in pseudo code, one possible EnumeratePartition( ) algorithm with emphasis directed to two supporting functions—MaxParSize( ) 502 and Score( ) 504—that control the operation of this phase.

The supporting function MaxParSize(S) 502 identifies or defines, either statically or dynamically, an allowed maximum size for the current subset S.

The supporting function Score($S_1$, $S_2$) 504 may implement any number of scoring models or paradigms including inter alia:

A) MinSel($S_1$, $S_2$)=selectivity($p_1 \wedge \ldots \wedge p_n$) where $p_1 \rightarrow p_n$ are the join predicates which join the subsets $S_1$ and $S_2$.

B) MinInput($S_1$, $S_2$)=cardinality($S_1$)+cardinality($S_2$). This approach considers the estimated sizes of the input table expressions.

C) MinSets($S_1$, $S_2$)=$\|S_1\|-\|S_2\|$. This approach, which considers the difference between the number of relations of the two children ($S_1$ and $S_2$), relates the costing of the partitions to how balanced the left and right subtrees are.

Figure 6:
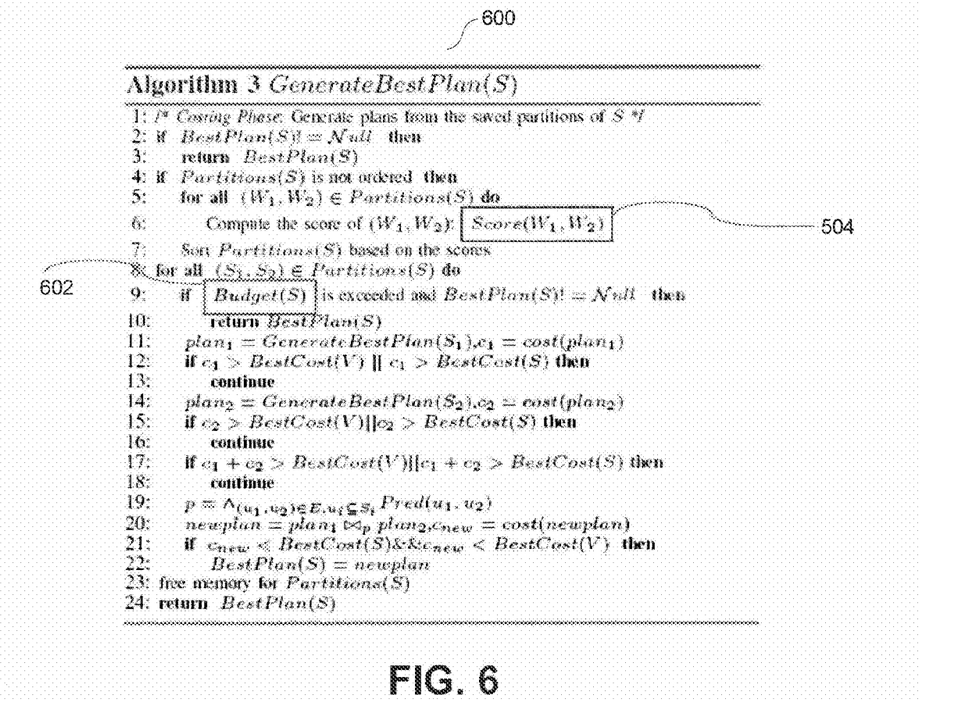
FIG. 6 illustrates one possible GenerateBestPlan( ) algorithm.

2) Phase 2, a plan generation phase, where execution plans are generated for only a fraction of the saved partitions based on various constraints so that inter alia unpromising partitions may be dropped (pruned). FIG. 6 and reference numeral 600 depict, at a high level and in pseudo code, one possible GenerateBestPlan( ) algorithm with emphasis directed to two supporting functions—Score( ) 504 (described above) and Budget( ) 602—that direct the operation of this phase.

The supporting function Budget( ) 602 defines possibly inter alia the desired partition pruning strategy. Among other things the Budget( ) function 602 has, during the execution life of the GenerateBestPlan( ) function, dynamic access to full and complete knowledge of the search space (including inter alia the number of enumerated partitions, the number of partitions that have already been pruned, etc.) and as a result the Budget( ) function 602 can among other things be dynamically adjusted, tuned, redefined, etc. For example, a Budget(S) function might be defined as Budget(S)= CurrentPruneFunction*|Partitions(S| where:

A) CostPerPar is the estimated CPU time for costing a partition (as measured µs.

B) BestCost(V) is the best estimated cost found this far for a complete plan (as measured in µs).

C) TotalPar is the number of partitions that were saved during the enumeration phase.

D) CostedPar is the number of partitions that have already been costed.

E) PrunedPar is the number of partitions that were pruned without costing.

F) CurrentTotalBudget=BestCost(V)/CostPerPar is the current maximum number of partitions to be costed.

G) CurrentPruneFunction=(CurrentTotalBudget−CostedPar)/(TotalPar−CostedPar−PrunedPar).

The different algorithms that were described above are illustrative only and it will be readily apparent to one of ordinary skill in the relevant art that various enhancements or modifications to an algorithm, numerous alternative algorithms, etc. are easily possible. For example and inter alia:

1) Other join enumeration algorithms that possibly inter alia (a) enumerate partitions and (b) employ memoization to save access plans may be substituted for algorithm X.

2) Two or more different join enumeration algorithms (that possibly inter alia (a) enumerate partitions and (b) employ memoization to save access plans) may be dynamically selected as an algorithm X during execution of an ordered-Par( ) algorithm.

3) In an EnumeratePartition( ) algorithm, sorting and/or pruning may be skipped if for example the search space is determined to be sparse.

4) Various enhanced system resource (e.g., memory, etc.) management capabilities may be implemented. As just one example, in the GenerateBestPlan( ) algorithm that is presented in FIG. 6 the memory that was allocated to a Partitions(S) construct is explicitly released at the end of the routine.

5) Any combination of different pruning approaches (e.g., cost-based, etc.) may be employed in a GenerateBestPlan( ) algorithm.

6) Any number of different Budget( ) functions may be employed. For example, a Budget(S) function might be defined as Budget(S) ∈ {min(¼ MaxParSize(S), |Partitions(S)|), 50%|Partitions(S)|100%|Partitions(S)|}.

7) A particular join enumeration algorithm (such as inter alia backtracking as offered by for example Sybase's SQL Anywhere) may be executed first, before an algorithm X is invoked, to obtain inter alia an initial or baseline cost.

Figure 7:
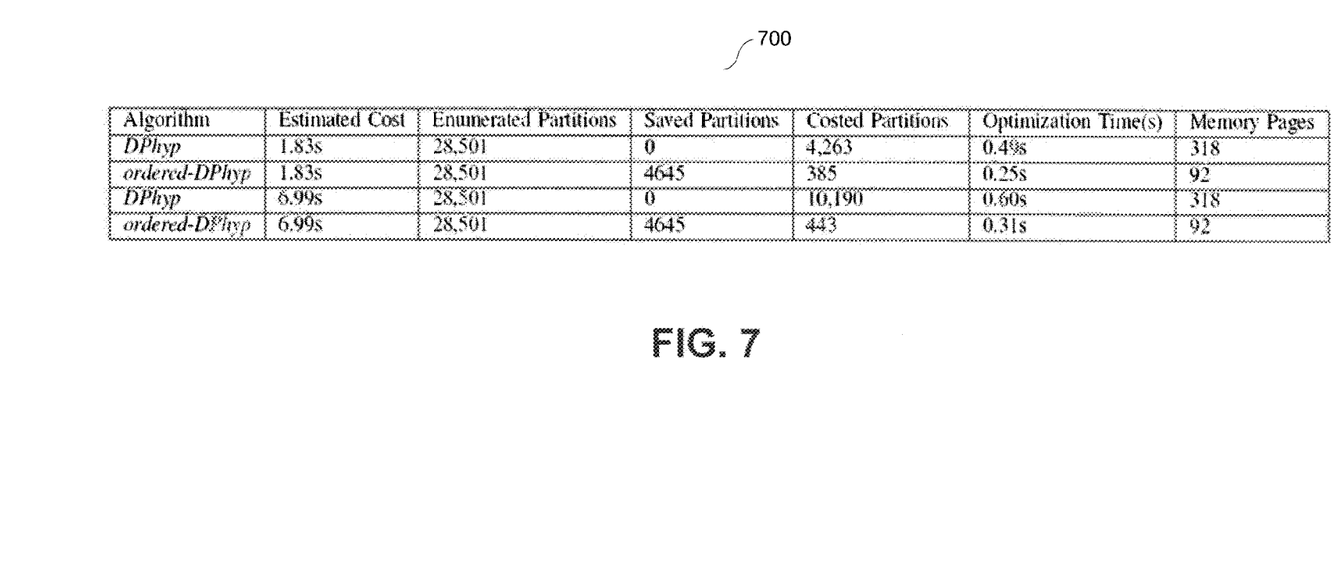
FIG. 7 captures the results of a particular query being optimized through two different algorithms.

FIG. 7 through FIG. 11 present various testing results that were obtained during empirical testing of the ordered-Par( ) algorithm:

1) FIG. 7 and reference numeral 700 capture the results of a particular query being optimized through two different algorithms, DPhyp( ) and ordered-DPhyp( ) (the DPhyp( ) algorithm augmented with the ordered-Par( ) algorithm), where Score( )=MinSel( ), MaxParSize( )=5, and Budget (S)= CurrentPruneFunction*|Partitions(S)|.

Figure 8:
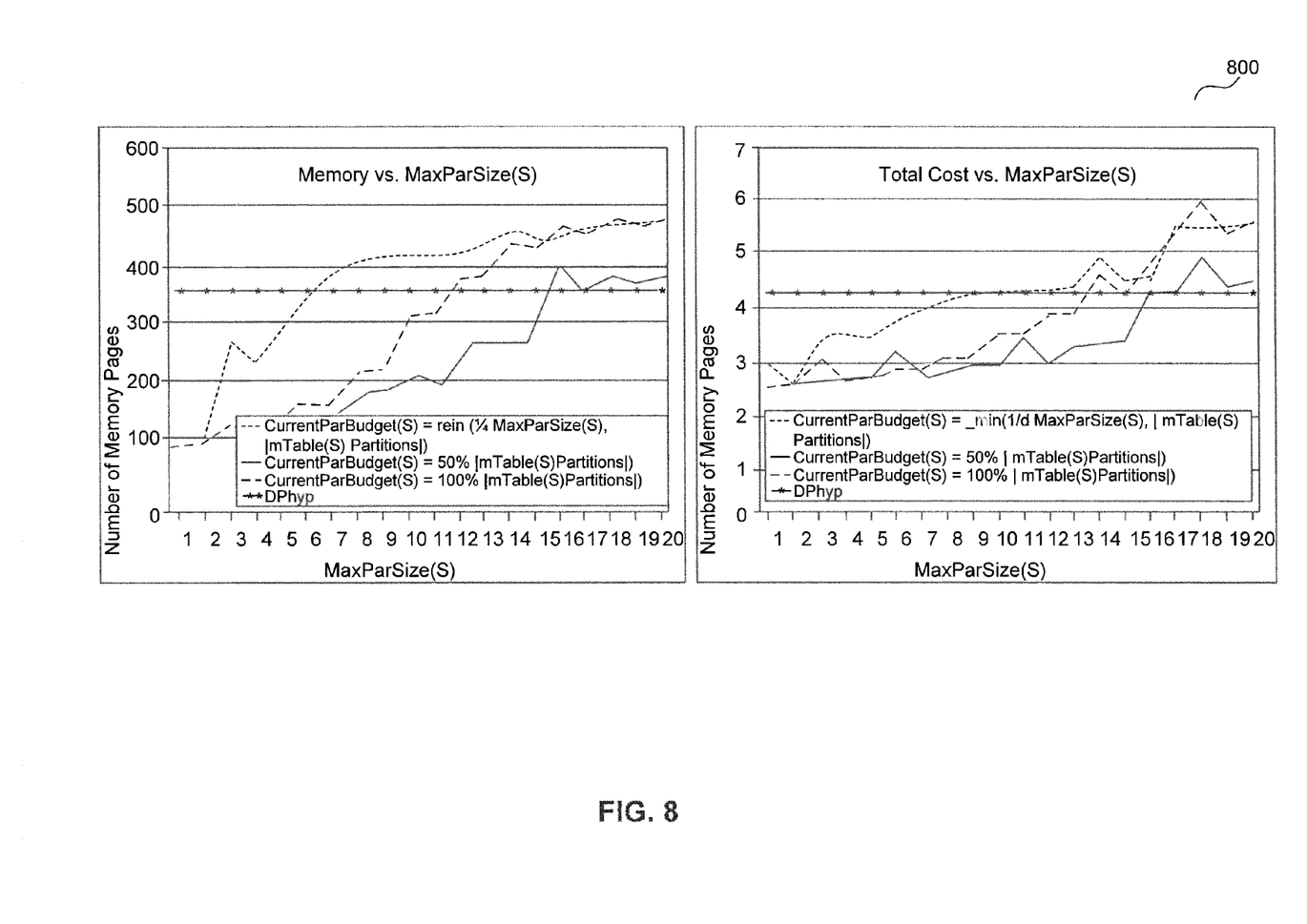
FIG. 8 captures two specific results from a particular query being optimized through two different algorithms.

2) FIG. 8 and reference numeral 800 capture two particular results (memory consumption and total cost) from a particular query being optimized through two different algorithms, DPhyp( ) and ordered-DPhyp( ) (the DPhyp( ) algorithm augmented with the ordered-Par( ) algorithm), where Score($S_1$, $S_2$)=MinSel($S_1$, $S_2$), MaxParSize(S) ∈ {1, 2, . . . , 20}, and Budget(S) ∈ {min(¼ MaxParSize(S), |Partitions(S)|), 50%|Partitions(S)|100%|Partitions(S)|}.

Figure 9:
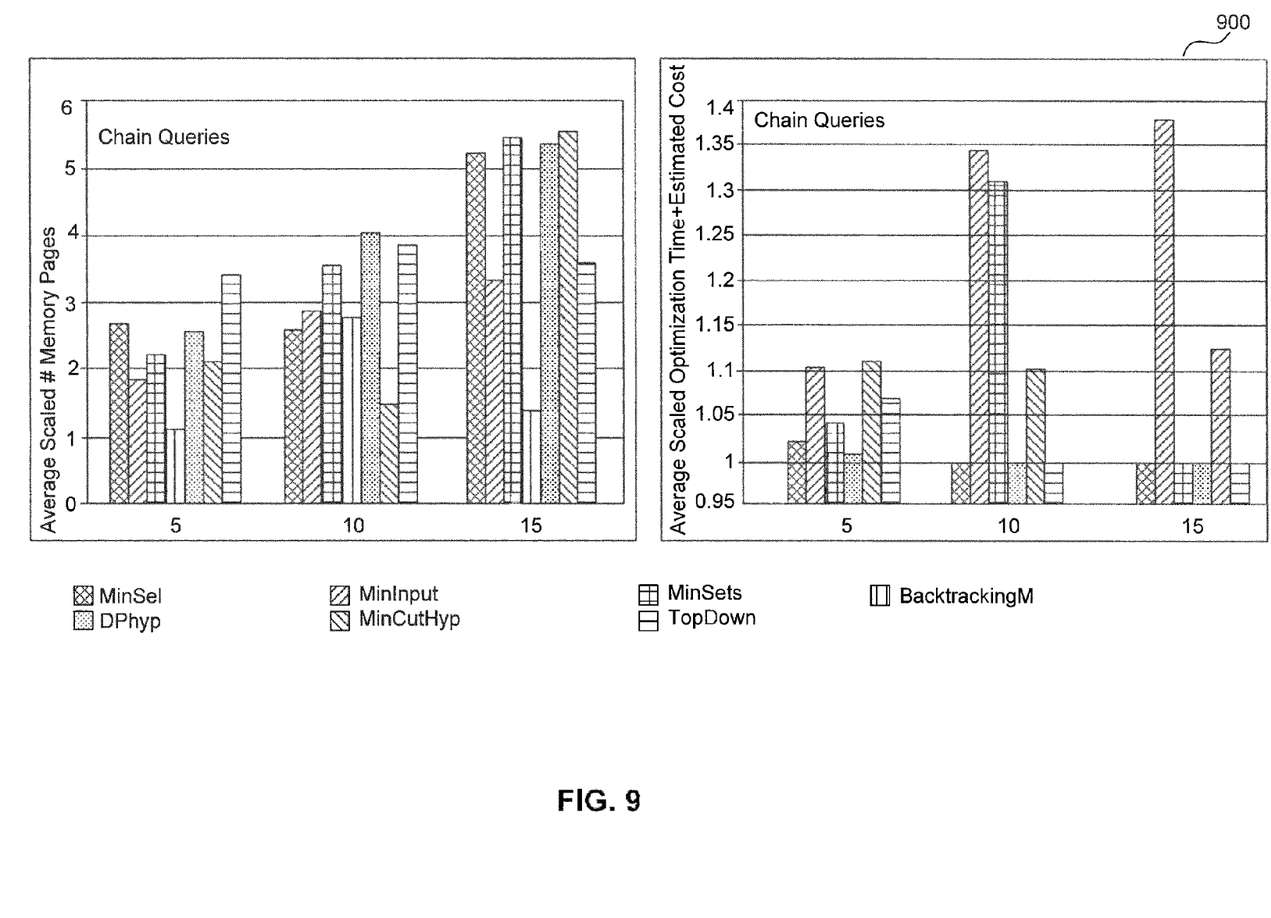
FIGS. 9→11 capture two specific results from a particular query having three different shapes being optimized through different algorithms.
Figure 10:
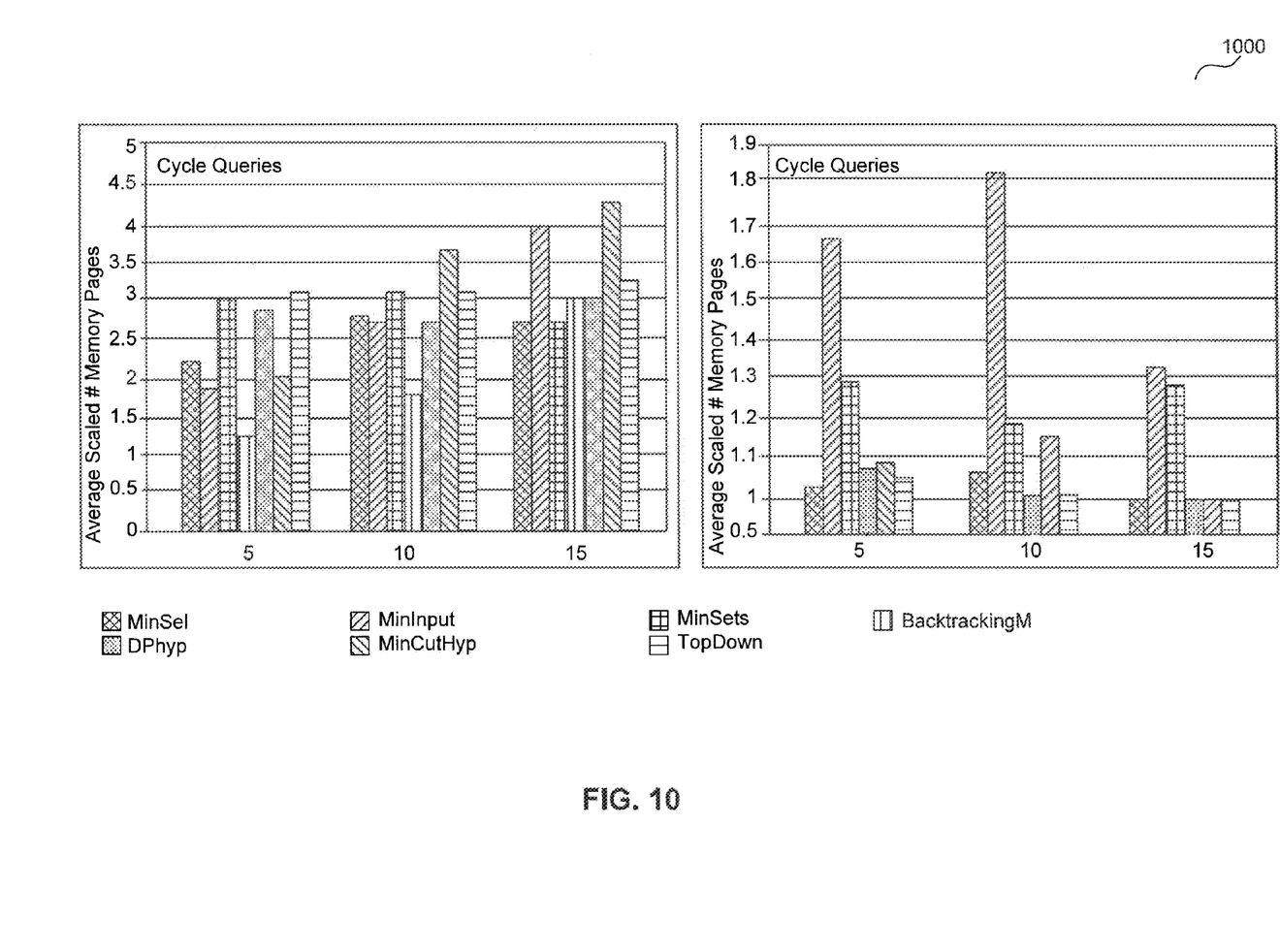
Figure 11:
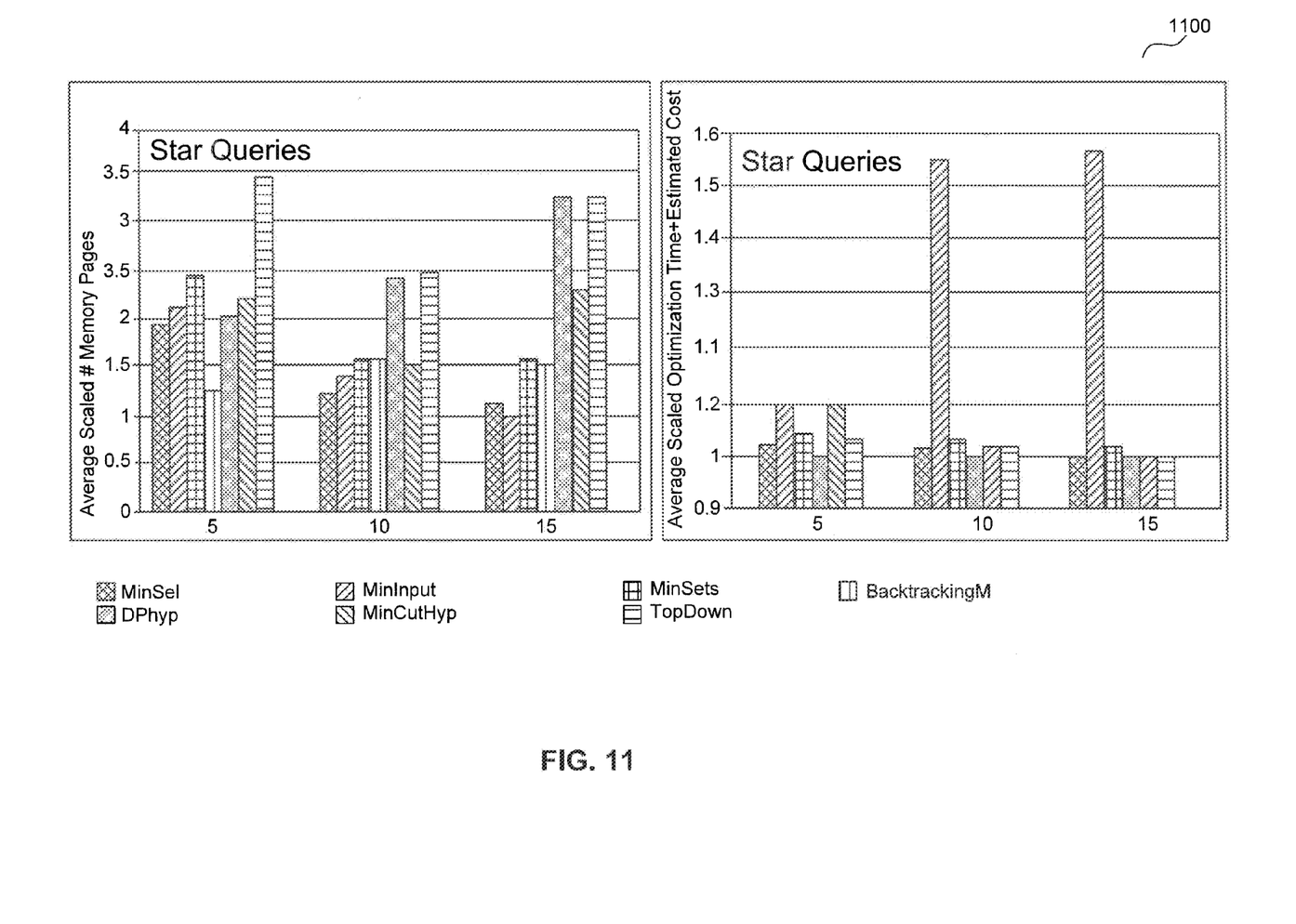

3) FIGS. 9→11 and reference numerals 900/1000/1100 capture two particular results (memory consumption and total cost) from a particular query having three different shapes—chain, cycle, and star—being optimized through different algorithms (backtrackingM, DPhyp, MinCutHyp, and TopDown as offered by for example Sybase's SQL Anywhere) vs. ordered-DPhyp( ) (the DPhyp( ) algorithm augmented with the ordered-Par( ) algorithm), where Score ($S_1$, $S_2$) ∈ {MinSel($S_1$, $S_2$), MinInput($S_1$, $S_2$), MinSets($S_1$, $S_2$)}, MaxParSize(S)=10, and Budget(S)=60%|Partitions (S)|.

In brief, during testing the ordered-DPhyp( ) algorithm exhibited advantageous characteristics (e.g., the costing of fewer partitions, the efficient consumption of memory, etc.) and yielded lower optimization times.

The technology that was described above may be implemented as logical operations and/or modules in or across one or more computer systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation details are a matter of choice, dependent on the performance requirements of the underlying system implementing the described technology. Accordingly, the logical operations making up the embodiments of the technology described above are referred to variously as operations, steps, objects, or modules. Furthermore, it should be understood that logical operations may be performed in any order, unless explicitly claimed otherwise or unless a specific order is inherently necessitated by the claim language.

The above specification provides a complete description of the structure and use of exemplary embodiments of the present invention. Although various embodiments of the invention have been described above with a certain degree of particularity, or with reference to one or more individual embodiments, it is to be understood that such material is exemplary only and it is not intended to be exhaustive or to limit the invention to the specific forms disclosed. Those skilled in the art could inter alia make numerous alterations to the disclosed embodiments without departing from the spirit or scope of this invention. Changes in detail or structure may be made without departing from the basic elements of the invention as defined in the appended claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

The following list defines acronyms as used in this disclosure:

| Acrony01 | Meaning |
| --- | --- |
| BIOS | Basic Input/Output System |
| CD-ROM | Compact Disc Read Only Memory |
| DBMS | Database Management System |
| DRAM | Dynamic Random Access Memory |
| EPROM | Erasable Programmable Read-Only Memory |
| GUI | Graphical User Interface |
| I/O | Input/Output |
| LAN | Local Area Network |
| MEMS | Microelectromechanical Systems |
| OS | Operating System |
| PC | Personal Computer |
| PCMCIA | Personal Computer Memory Card International Association |
| PDA | Personal Digital Assistant |
| PROM | Programmable Read-Only Memory |
| RAM | Random Access Memory |
| RDBMS | Relational Database Management System |
| RF | Radio Frequency |
| SQL | Structured Query Language |
| WAN | Wide Area Network |
| WWW | World Wide Web |

What is claimed is:

1. A computer-implemented method for selecting an execution plan for a database request, the method comprising:
processing aspects of the database request, including at least:
enumerating a portion of possible valid logical plans, based on at least a maximum search space size, yielding enumerated logical plans,
preserving, uncosted, a portion of the enumerated logical plans, yielding a candidate search space,
ordering entries in the candidate search space based on at least a dynamic scoring function, yielding a candidate search space order, and
generating a physical plan for a portion of the entries in the candidate search space, yielding generated physical plans, wherein:
the generating proceeds according to the candidate search space order and a dynamic budget function so as to drop unpromising entries, and
the dynamic budget function defines a desired partition pruning strategy, is dynamically updated during the generating, and is determined based on a difference between a current maximum number of logical plans to be costed and a number of logical plans that have already been costed divided by a difference between a total number of logical plans saved during the enumerating and a number of costed logical plans and a number of logical plans pruned without costing;
reviewing a subset of the generated physical plans to select the execution plan;
executing the database request based on the selected execution plan; and
returning a result of the executed database request.

2. The method of claim 1, wherein the database request includes a Structured Query Language statement.

3. The method of claim 1, wherein the dynamic scoring function evaluates a logical property of the enumerated logical plans.

4. The method of claim 1, wherein the dynamic scoring function evaluates a characteristic of one or more join predicates.

5. The method of claim 1, wherein the dynamic scoring function evaluates a size of one or more database objects.

6. The method of claim 5, wherein the one or more database objects include at least one database table.

7. The method of claim 1, wherein the processing step and the reviewing step reside within a join enumeration algorithm that at least enumerates a plurality of logical plans and generates a plurality physical plans.

8. A non-transitory computer readable medium having instructions stored thereon that when executed by a processor, cause the processor to perform operations for selecting an execution plan for a database request, the operations comprising:
processing aspects of the database request, including at least:
enumerating a portion of possible valid logical plans, based on at least a maximum search space size, yielding enumerated logical plans,
preserving, uncosted, a portion of the enumerated logical plans, yielding a candidate search space,
ordering entries in the candidate search space based on at least a dynamic scoring function, yielding a candidate search space order, and
generating a physical plan for a portion of the entries in the candidate search space, yielding generated physical plans, wherein:
the generating proceeds according to the candidate search space order and a dynamic budget function so as to drop unpromising entries, and
the dynamic budget function defines a desired partition pruning strategy, is dynamically updated during the generating, and is determined based on a difference between a current maximum number of logical plans to be costed and a number of logical plans that have already been costed divided by a difference between a total number of logical plans saved during the enumerating and a number of costed logical plans and a number of logical plans pruned without costing;
reviewing a subset of the generated physical plans to select the execution plan;
executing the database request based on the selected execution plan; and
returning a result of the executed database request.

9. The non-transitory computer readable medium of claim 8, wherein the database request includes a Structured Query Language statement.

10. The non-transitory computer readable medium of claim 8, wherein the dynamic scoring function evaluates a logical property of the enumerated logical plans.

11. The non-transitory computer readable medium of claim 8, wherein the dynamic scoring function evaluates a characteristic of one or more join predicates.

12. non-transitory computer readable medium of claim 8, wherein the dynamic scoring function evaluates a size of one or more database objects.

13. The non-transitory computer readable medium of claim 12, wherein the one or more database objects include at least one database table.

14. The non-transitory computer readable medium of claim 8, wherein the processing step and the reviewing step reside within a join enumeration algorithm that at least enumerates a plurality of logical plans and generates a plurality physical plans.

15. A system comprising:
one or more processors;
one or more computer readable media; and
computer readable instructions stored on the one or more computer readable media that when executed by the one or more processors, cause the one or more processors to perform operations for selecting an execution plan for a database request by:
processing aspects of the database request, including at least:
enumerating a portion of possible valid logical plans, based on at least a maximum search space size, yielding enumerated logical plans,
preserving, uncosted, a portion of the enumerated logical plans, yielding a candidate search space,
ordering entries in the candidate search space based on at least a dynamic scoring function, yielding a candidate search space order,
generating a physical plan for a portion of the entries in the candidate search space, yielding generated physical plans, wherein:
the generating proceeds according to the candidate search space order and a dynamic budget function so as to drop unpromising entries, and
the dynamic budget function defines a desired partition pruning strategy, is dynamically updated during the generating, and is determined based on a difference between a current maximum number of logical plans to be costed and a number of logical plans that have already been costed divided by a difference between a total number of logical plans saved during the enumerating and a number of costed logical plans and a number of logical plans pruned without costing, reviewing a subset of the generated physical plans to select the execution plan, executing the database request based on the selected execution plan, and returning a result of the executed database request.

16. The system of claim 15, wherein the database request includes a Structured Query Language statement.

17. The system of claim 15, wherein the dynamic scoring function evaluates a logical property of the enumerated logical plans.

18. The system of claim 15, wherein the dynamic scoring function evaluates a characteristic of one or more join predicates.

19. The system of claim 15, wherein the dynamic scoring function evaluates a size of one or more database objects.

20. The system of claim 19, wherein the one or more database objects include a database table.

21. The system of claim 15, wherein the processing step and the reviewing step reside within a join enumeration algorithm that at least enumerates a plurality of logical plans and generates a plurality physical plans.

22. A system comprising:
one or more processors;
a memory coupled to at least one of the one or more processors; and
a query optimizer residing in the memory that, when executed by at least one of the one or more processors:
enumerates, for a database request, a portion of possible valid logical plans, based on at least a maximum search space size, yielding enumerated logical plans;
preserves, uncosted, a portion of the enumerated logical plans, yielding a candidate search space;
orders entries in the candidate search space based on at least a dynamic scoring function, yielding a candidate search space order;
generates a physical plan for a portion of the entries in the candidate search space, yielding generated physical plans, wherein:
the generating proceeds according to the candidate search space order and a dynamic budget function so as to drop unpromising entries, and
the dynamic budget function defines a desired partition pruning strategy, is dynamically updated during the generating, and is determined based on a difference between a current maximum number of logical plans to be costed and a number of logical plans that have already been costed divided by a difference between a total number of logical plans saved during the enumerating and a number of costed logical plans and a number of logical plans pruned without costing; and
reviews a subset of the generated physical plans to select an execution plan,
wherein the at least one of the one or more processors:
executes the database request based on the selected execution plan; and
returns a result of the executed database request.

* * * * *